(12) United States Patent
Baek

(10) Patent No.: US 11,671,643 B2
(45) Date of Patent: Jun. 6, 2023

(54) PERSONALIZED HOME SHOPPING BROADCAST SYSTEM

(71) Applicant: ANYPOINT MEDIA CO., LTD., Seoul (KR)

(72) Inventor: Wonjang Baek, Seongnam-si (KR)

(73) Assignee: ANYPOINT MEDIA CO., LTD., Seoul (KR)

( * ) Notice: Subject to any disclaimer, the term of this patent is extended or adjusted under 35 U.S.C. 154(b) by 417 days.

(21) Appl. No.: 16/896,186

(22) Filed: Jun. 8, 2020

(65) Prior Publication Data

US 2020/0304856 A1 Sep. 24, 2020

Related U.S. Application Data

(63) Continuation of application No. PCT/KR2018/014243, filed on Nov. 20, 2018.

(30) Foreign Application Priority Data

Dec. 21, 2017 (KR) .................. 10-2017-0176673

(51) Int. Cl.
*H04N 21/2668* (2011.01)
*G06Q 30/0201* (2023.01)
(Continued)

(52) U.S. Cl.
CPC ..... *H04N 21/2668* (2013.01); *G06Q 30/0206* (2013.01); *G06Q 30/0264* (2013.01); *G06Q 30/0271* (2013.01); *H04N 21/251* (2013.01); *H04N 21/2542* (2013.01); *H04N 21/25891* (2013.01); *G06Q 10/087* (2013.01)

(58) Field of Classification Search
None
See application file for complete search history.

(56) References Cited

U.S. PATENT DOCUMENTS

| 2003/0041104 A1 * | 2/2003 | Wingard | H04N 21/4821 348/E5.006 |
| 2007/0186252 A1 * | 8/2007 | Maggio | H04N 21/4622 705/28 |

(Continued)

FOREIGN PATENT DOCUMENTS

| AU | 2005299414 A1 * | 5/2007 | ............. G06Q 30/02 |
| CN | 105187865 A | 12/2015 | |

(Continued)

OTHER PUBLICATIONS

Korea Office Action dated Dec. 10, 2018, issued to Korean Application No. 10-2017-0176673.

(Continued)

*Primary Examiner* — Ricky Chin
(74) *Attorney, Agent, or Firm* — Stein IP, LLC

(57) ABSTRACT

In accordance with the technique described herein, a home shopping content suitable for a specific viewer can be dynamically selected and provided using viewing histories of a home shopping channel. Particularly, a home shopping content in which a large number of viewers are interested can be provided by dynamically selecting a home shopping content using product classification groups specified for receivers using an interest index calculated based on a bounce rate defined by the technique described herein.

17 Claims, 8 Drawing Sheets

(51) Int. Cl.
　　*G06Q 30/0251*　　(2023.01)
　　*H04N 21/25*　　(2011.01)
　　*H04N 21/254*　　(2011.01)
　　*H04N 21/258*　　(2011.01)
　　*G06Q 10/087*　　(2023.01)

(56) References Cited

U.S. PATENT DOCUMENTS

| | | | | |
|---|---|---|---|---|
| 2008/0140532 | A1* | 6/2008 | Johnson | H04N 21/4185 |
| | | | | 705/26.1 |
| 2011/0145846 | A1* | 6/2011 | Kim | H04N 21/2542 |
| | | | | 725/62 |
| 2012/0311649 | A1* | 12/2012 | Patten | G06Q 30/02 |
| | | | | 725/97 |
| 2014/0196071 | A1* | 7/2014 | Terpstra | H04N 21/44008 |
| | | | | 725/19 |
| 2014/0359644 | A1* | 12/2014 | Kumar | H04N 21/23418 |
| | | | | 725/60 |
| 2016/0100207 | A1* | 4/2016 | Uhm | H04N 21/258 |
| | | | | 725/10 |
| 2018/0348965 | A1* | 12/2018 | Stekkelpak | H04N 21/2743 |
| 2019/0281359 | A1* | 9/2019 | Johnson | H04N 21/6581 |
| 2020/0304856 | A1* | 9/2020 | Baek | H04N 21/44222 |
| 2020/0304877 | A1* | 9/2020 | Baek | G06Q 30/0255 |

FOREIGN PATENT DOCUMENTS

| | | |
|---|---|---|
| CN | 111602407 B | 7/2022 |
| KR | 10-0802552 B1 | 2/2008 |
| KR | 10-2012-0008346 A | 1/2012 |
| KR | 10-2014-0006383 A | 1/2014 |
| KR | 10-1532593 B1 | 6/2015 |
| KR | 10-1539182 B1 | 7/2015 |
| KR | 10-2016-0041437 A | 4/2016 |
| KR | 10-1751708 B1 | 7/2017 |
| KR | 10-1976428 B1 | 5/2019 |

OTHER PUBLICATIONS

International Search Report dated Feb. 25, 2019, issued to International Application No. PCT/KR2018/014243.
Office Action dated Dec. 16, 2021, issued to the counterpart Chinese Patent Application No. 201880081327.2.
European Search Report dated Aug. 3, 2021, issued to corresponding European Application No. 18891396.6.

* cited by examiner

FIG. 4

| ID OF FIRST RECEIVER | CHANNEL NO. 53 |
|---|---|
| 07:15:05 AM | 07:15:24 AM |
| 07:50:23 AM | 07:50:25 AM |
| 08:05:10 AM | 08:05:30 AM |
| ID OF SECOND RECEIVER | CHANNEL NO. 53 |
| 07:25:05 AM | 07:25:24 AM |
| 07:55:23 AM | 07:55:25 AM |
| 08:15:10 AM | 08:15:30 AM |

FIRST VIEWING HISTORY (rows 1-4)
SECOND VIEWING HISTORY (rows 5-8)

. . .

| ID OF n-th RECEIVER | CHANNEL NO. 53 |
|---|---|
| 07:35:05 AM | 07:35:24 AM |
| 07:57:23 AM | 07:57:25 AM |
| 08:52:10 AM | 08:25:30 AM | n-th VIEWING HISTORY

PERSONALIZED HOME SHOPPING BROADCAST SYSTEM

CROSS-REFERENCE TO RELATED PATENT APPLICATION

This application is a bypass continuation of International Application No. PCT/KR2018/014243, filed on Nov. 20, 2018, in the WIPO, and Korean Patent Application No. 10-2017-0176673, filed on Dec. 21, 2017, in the Korea Intellectual Property Office, the entire contents of which are hereby incorporated by reference.

BACKGROUND

1. Field

The present disclosure relates to a personalized home shopping broadcast system.

2. Description of the Related Art

The development in communication technologies and computing technologies is leading to fast development in broadcasting services. The ratings (viewer ratings) of the broadcasting services are measured to evaluate the efficiency of the broadcasting services. For example, a broadcasting service provider may use the ratings as a reference to evaluate quality such as viewer's satisfaction for the broadcasting services, and an advertiser may use the ratings as a reference to determine the advertisement effects from the broadcasting services.

The ratings are measured by selecting a sample group having uniform distribution in terms of, e.g., geographic location, age, gender, and education level, and collecting viewing behavior information about the broadcasting services provided to the sample group.

Since, however, the conventional rating measuring method measures the ratings of the sample group, the measured ratings are different from the actual ratings. In addition, since a complicated method is used to measure the ratings, even the ratings of the sample group are not accurately measured.

In order to solve such a drawback, Korean Patent No. 10-1751708 (Patent Document 1) entitled "Analysis method and system for audience rating and advertisement effects based on viewing behavior recognition", which was filed on Aug. 17, 2012 and registered on Jun. 22, 2017 by Electronics and Telecommunications Research Institute, discloses therein a method of measuring an audience rating of a sample group with higher accuracy by receiving a viewer image, generating viewer recognition information based on the received image, and generating viewing behavior information based on the viewer recognition information.

However, the method disclosed in Korean Patent No. 10-1751708 also uses a complicated method such as pre-registration of viewers for measuring the audience rating.

Meanwhile, the bounce rate generally represents a percentage of visitors who visit a web site and then leave without receiving information or rather than continuing to view other pages within the website. More specifically, the bounce rate represents a percentage of visitors who visit a website having a start page and a sub-page linked to the start page and then leave without visiting the sub-page. A high bounce rate typically indicates that visitors only view a website with a low probability of behavior such as product purchase. A low bounce rate indicates that visitors view a website and proceeds to behavior such as product purchase at a high probability. Therefore, the bounce rate can be used as a reference for evaluating especially websites on the internet.

However, the bounce rate is used as a reference that can only be applied to the internet services such as a web page, and such a bounce rate cannot be applied to the broadcasting services. In other words, the broadcasting services provide contents continuously unlike the web page, so that there are no start page and no sub-pages. Therefore, the bounce rate applied to internet services cannot be applied to the broadcasting services Meanwhile, in general, home shopping refers to a service that is provided through a broadcast network or a communication network to purchase various goods or services. When the service is provided through, e.g., the broadcast network, the home shopping can be realized in such a manner that a home shopping company transmits a home shopping content of a product to a viewer's receiver through a predetermined channel and the viewer who watches the home shopping content purchases the product.

The broadcasting method used for home shopping may be digital broadcasting or analog broadcasting. The receiver may be, e.g., any one of a television, a set-top box, a personal computer, or a mobile communication terminal (i.e., smart phone) having a computing function each of which receives and provides a home shopping content.

The viewers can purchase a product in a broadcasted home shopping content using, e.g., a payment interface displayed on the receiver or a telephone ordering process.

However, the conventional home shopping has the following drawbacks.

A home shopping company transmits home shopping contents to all of multiple viewers at the same time based on broadcasting schedules. In other words, the conventional home shopping contents are provided to all of the viewers in the broadcasting manner. Therefore, it is not possible to provide home shopping contents for a limited target such as a particular viewer group or a particular viewer.

Further, since, in sequence of the broadcasting schedules, predetermined home shopping contents are transmitted to all of the multiple viewers, the viewers should wait until a desired home shopping content is scheduled to purchase a desired product.

Korean Patent Application Publication No. 10-2014-0006383 (Patent Document 2) entitled "Product selling system and server for connecting on-line shopping and home-shopping", which was filed on Jul. 5, 2012 and published on Jan. 16, 2014 by CJ O SHOPPING CO., LTD, discloses a method of selling a product suitable for a viewer through a home shopping channel while a home shopping and an online shopping interwork with each other. However, according to the method disclosed in Korean Patent Application Publication No. 10-2014-0006383, it is merely disclosed that the product to be sold through the home shopping channel is selected based on product information received from an online server. The method disclosed in Korean Patent Application Publication No. 10-2014-0006383 may be advantageous in that it is possible to select a suitable product and broadcast the suitable product to a larger number of viewers. However, the method still has the drawback of the conventional case described above.

RELATED ART DOCUMENT

Patent Document

Patent Document 1: Korean Patent No. 10-1751708
Patent Document 2: Korean Patent Application Publication No. 10-2014-0006383.

SUMMARY

Described herein is a technique capable of providing a personalized home shopping broadcast system capable of dynamically selecting and providing a home shopping content suitable for a specific viewer using viewing histories of a home shopping channel.

According to one aspect of the technique of the present disclosure, there is provided a personalized home shopping broadcast system including: one or more processors; one or more memories; and one or more programs that are stored in the one or more memories and executed by the one or more processors. The one or more programs includes: a first instruction that, when executed, extracts a product classification group for each of a first receiver to an n-th receiver that receives and provides a home shopping channel from a product classification criterion, that includes a first product classification to a k-th product classification determined in advance, based on a viewing history of the home shopping channel received from each of the first to n-th receivers where each of "n" and "k" is a natural number of 2 or higher; a second instruction that, when executed, specifies a basic content for a basic product to be provided through the home shopping channel for a predetermined time period according to a broadcasting schedule; and a third instruction that, when executed, dynamically selects, from a plurality of contents, a first personalized content for a first product to be provided through the home shopping channel for the predetermined time period such that the number of product classification groups, each of which includes at least one of a product classification of the basic product and a product classification of the first product among the product classification groups for the first to n-th receivers, becomes the maximum.

BRIEF DESCRIPTION OF THE DRAWINGS

FIG. 4 shows examples of viewing histories of a home shopping channel used in the personalized home shopping broadcast system according to the embodiments described herein.

DETAILED DESCRIPTION

Figure 1:
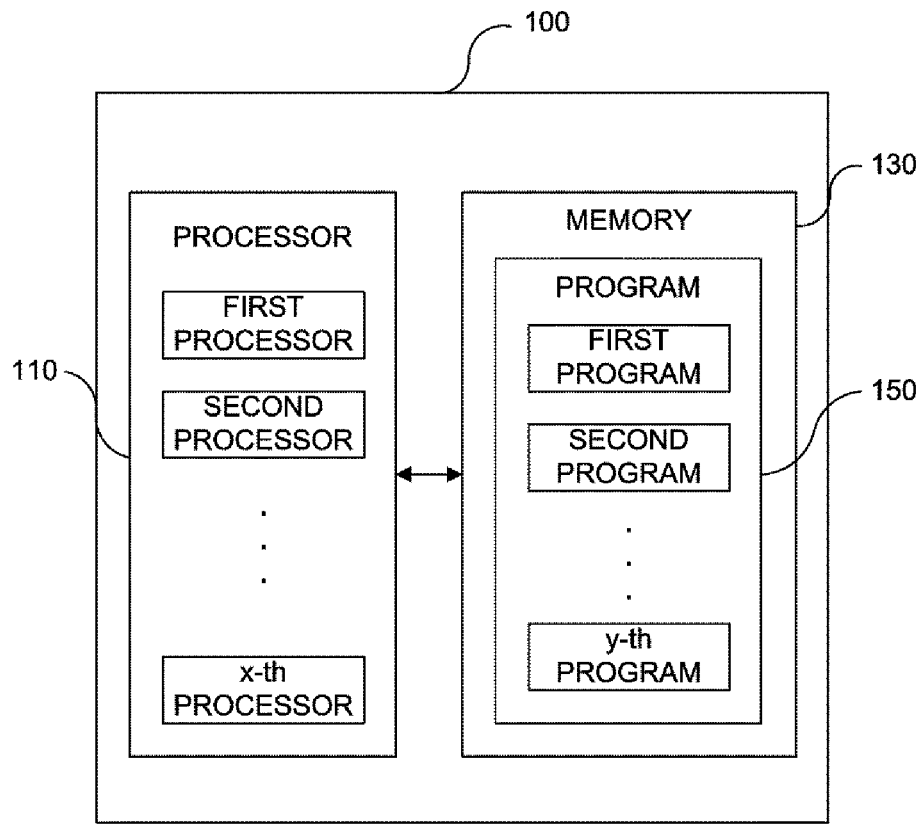
FIG. 1 is a block diagram showing an exemplary configuration of a personalized home shopping broadcast system according to one or more embodiments described herein.

Hereinafter, one or more embodiments (also simply referred to as "embodiments") of a personalized home shopping broadcast system according to the technique of the present disclosure will be described in detail with reference to the accompanying drawings. In the drawings for describing the embodiments of the present disclosure, only a part of the practical configurations may be illustrated, a part of the practical configurations may be omitted or changed, and relative dimensions and proportions of parts therein may be exaggerated or reduced in size for the sake of convenience of description.

First Embodiment

FIG. 1 is a block diagram showing an exemplary configuration of a personalized home shopping broadcast system according to the embodiments described herein.

Referring to FIG. 1, a personalized home shopping broadcast system 100 according to the embodiments described herein includes one or more processors 110, one or more memories 130, and one or more programs 150 that are stored in the one or more memories 130 and executed by the one or more processors 110. The one or more processors 110 may be implemented by a semiconductor device such as a CPU (Central Processing Unit). The one or more memories 130 may be implemented by a semiconductor device such as a flash memory and a HDD (Hard Disk Drive).

The one or more processors 110 read and execute the one or more programs 150 stored in the one or more memories 130. In FIG. 1, the number of processors 110 is x where x is a natural number and, thus, there may be one processor 110 or multiple processors 110. In other words, the function of the personalized home shopping broadcast system 100 can be realized by one processor or a cooperative operation of multiple processors. For example, the function of the personalized home shopping broadcast system 100 can be realized by causing a first processor to execute a calculation function and a second processor to execute a communication function.

The one or more memories 130 store the one or more programs 150. The one or more memories 130 are storage media such as a non-volatile memory or a volatile memory that is computer-readable storage medium. In FIG. 1, although one memory 130 is illustrated, there may be multiple memories 130.

Further, in FIG. 1, the number of programs 150 is y where y is a natural number and, thus, there may be one program 150 or multiple programs 150. In other words, the function of the personalized home shopping broadcast system 100 can be realized by one program or by a cooperative operation of multiple programs. For example, the function of the personalized home shopping broadcast system 100 can be realized by causing a first program to execute a calculation function and a second program to execute a communication function.

Hereinafter, the one or more processors 110, the one or more memories 130, the one or more programs 150 will be referred to as "processor 110," "memory 130," and "program 150," respectively.

Figure 2:
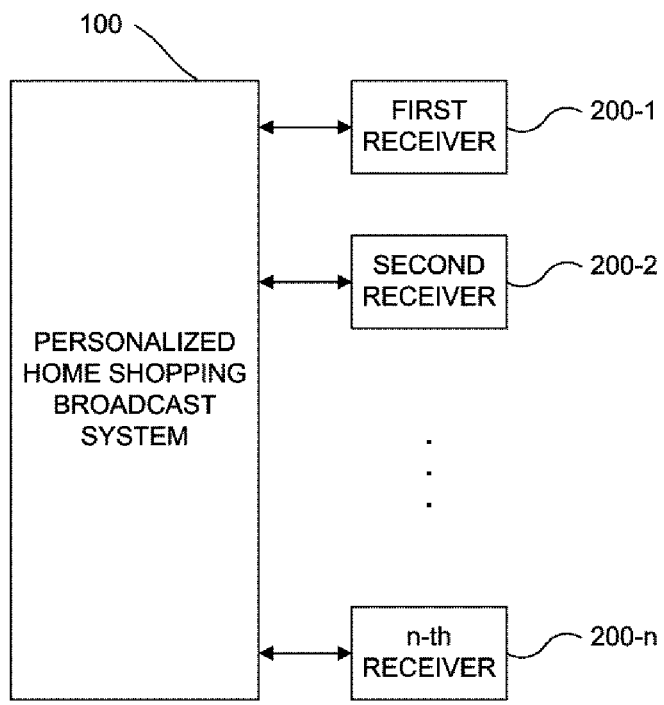
FIG. 2 shows a system environment in which the personalized home shopping broadcast system according to the embodiments described herein operates.

FIG. 2 shows a system environment in which the personalized home shopping broadcast system according to the embodiments described herein operates.

Referring to FIG. 2, the system environment in which the personalized home shopping broadcast system according to the embodiments described herein operates includes the personalized home shopping broadcast system 100 and a first receiver 200-1 to an n-th receiver 200-n where n is a natural number of 2 or higher.

The personalized home shopping broadcast system 100 transmits a content (hereinafter, may also be referred to as "home shopping content") to the first receiver 200-1 to the n-th receiver 200-n through a broadcast network or a communication network. The personalized home shopping broadcast system 100 may provide a plurality of home shopping contents to the first receiver 200-1 to the n-th receiver 200-n. Particularly, the personalized home shopping broadcast system 100 may provide a basic content specified by a broadcasting schedule and at least one of a first personalized content and a second personalized content selected from multiple contents to the first receiver 200-1 to the n-th receiver 200-n.

Each of the first receiver 200-1 to the n-th receiver 200-n may be, e.g., any one of a set-top box, a television, a personal computer, and a mobile communication terminal having a computing function, each of which receives and provides digital broadcasting. In this specification, "digital broadcasting" refers to broadcasting services such as digital terrestrial broadcasting, digital cable broadcasting, digital satellite broadcasting, digital multimedia broadcasting (DMB), internet protocol television (IP-TV), over the top (OTT), and video on demand (VOD) broadcasting. Preferably, the first receiver 200-1 to the n-th receiver 200-n are configured to perform two-way communication such as IP-TV and transmit and receive data to and from the personalized home shopping broadcast system 100. Here, "n" may indicate either the total number of receivers that can receive and provide a home shopping channel or the number of predetermined receivers that can receive and provide the home shopping channel among the entire receivers.

Figure 3:
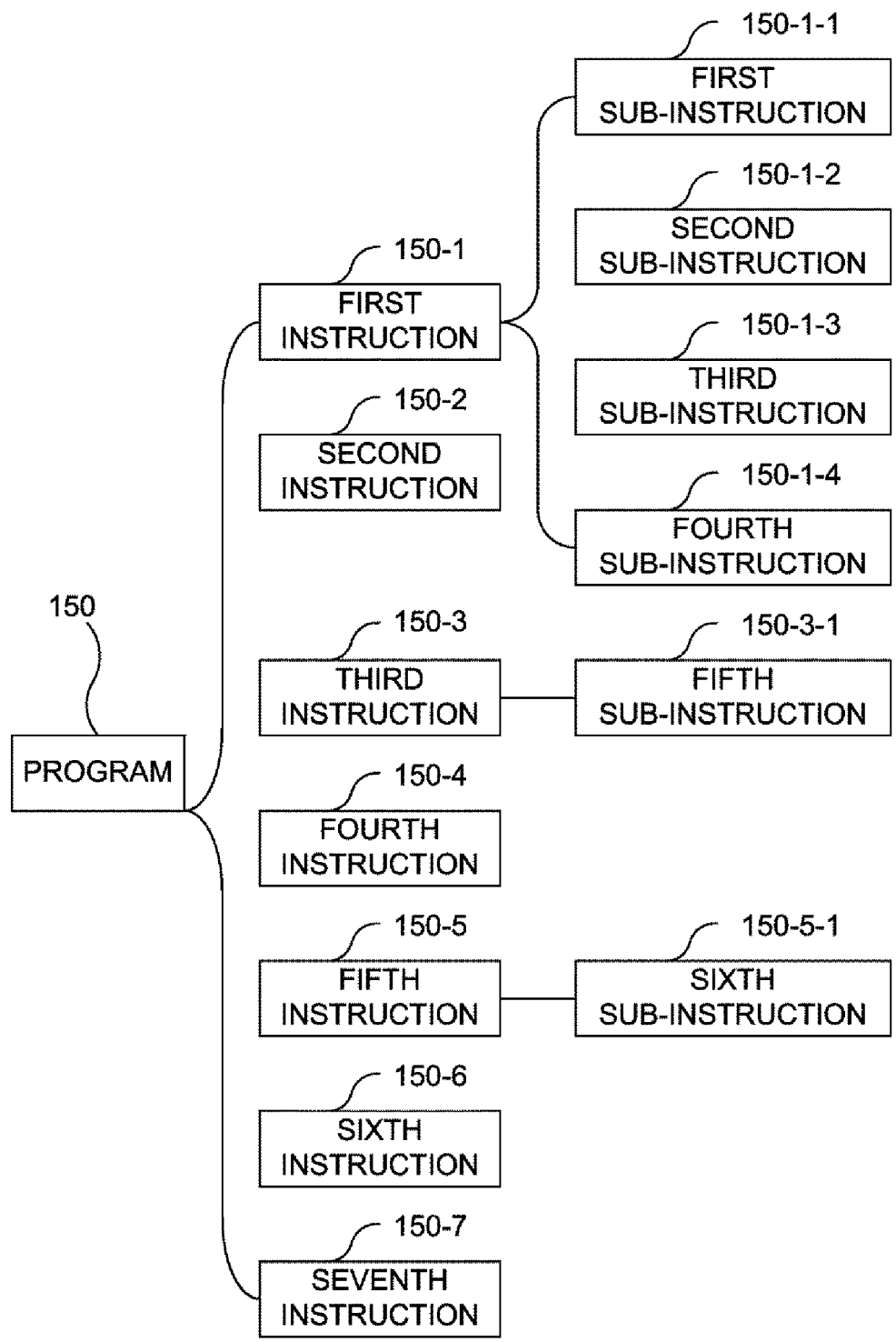
FIG. 3 is a block diagram showing an example of a program that is stored in and executed by the personalized home shopping broadcast system according to the embodiments described herein.

FIG. 3 is a block diagram showing an example of a program that is stored in and executed by the personalized home shopping broadcast system according to the embodiments described herein.

Referring to FIG. 3, the program 150 includes a first instruction 150-1 to a third instruction 150-3. The program 150 may further include at least one of a fourth instruction 150-4 to a seventh instruction 150-7. The first instruction 150-1 may include a first sub-instruction 150-1-1 to a fourth sub-instruction 150-1-4. The third instruction 150-3 may include a fifth sub-instruction 150-3-1. A fifth instruction 150-5 may include a sixth sub-instruction 150-5-1.

The first instruction 150-1, when executed, extracts a product classification group for each of the first receiver 200-1 to the n-th receiver 200-n that receives and provides a home shopping channel from the product classification criterion, that includes a first product classification to a k-th product classification (k being a natural number of 2 or higher) that are determined in advance, based on a viewing history of the home shopping channel received from each of the first receiver 200-1 to the n-th receiver 200-n.

FIG. 4 shows examples of viewing histories of a home shopping channel used in the personalized home shopping broadcast system according to the embodiments described herein.

Referring to FIG. 4, the viewing histories may include a first viewing history received from the first receiver 200-1 to an n-th viewing history received from the n-th receiver 200-n.

For example, when the home shopping channel is a channel No. 53, the first viewing history received from the first receiver 200-1 may include a time at which the first receiver 200-1 receives a user input of selecting the channel No. 53 and a time at which the first receiver 200-1 receives a user input of leaving the channel No. 53. The user input of leaving the channel No. 53 may include a user input of turning off the power of the receiver. Alternatively, the viewing history may include, instead of the time at which the user input of leaving the channel No. 53 is received, the difference between the time at which the user input of leaving the channel No. 53 is received and the time at which the user input of selecting the channel No. 53 is received, i.e., the time period for continuing to view the channel No. 53.

The personalized home shopping broadcast system 100 is configured to receive, e.g., the first viewing history to the n-th viewing history from the first receiver 200-1 to the n-th receiver 200-n, respectively.

Figure 5:
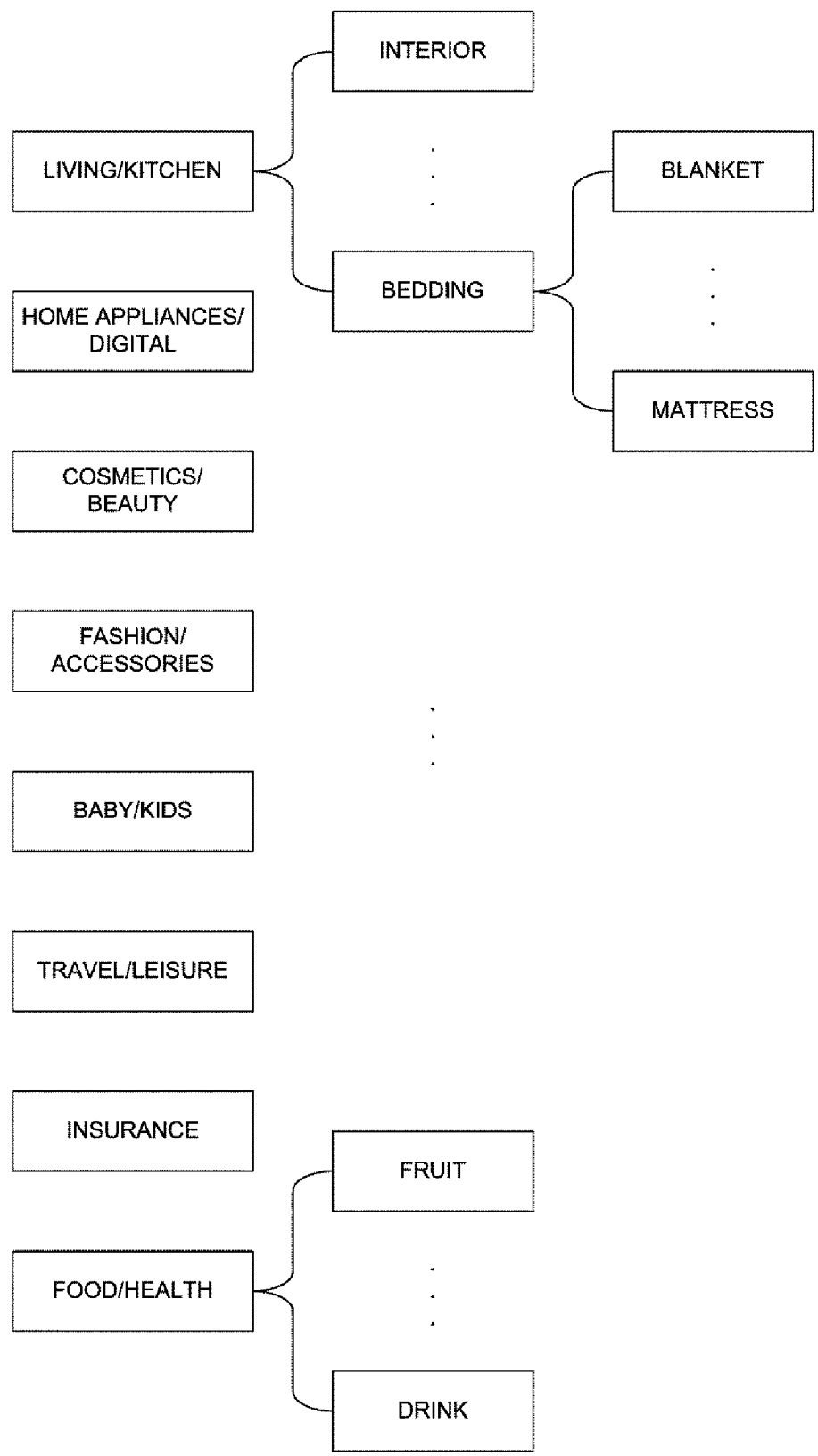
FIG. 5 shows an example of a product classification criterion used in the personalized home shopping broadcast system according to the embodiments described herein.

FIG. 5 shows an example of a product classification criterion used in the personalized home shopping broadcast system according to the embodiments described herein.

Referring to FIG. 5, the product classification criterion is set hierarchically and is configured to include, e.g., a first class including "living/kitchen" to "food/health"; a second class including "interior" to "bedding" being subordinate to the first class of "living/kitchen"; and a third class including "blanket" to "mattress" being subordinate to the second class of "bedding."

Each of the first product classification to the k-th product classification may be determined and classified by any one of the first class to the third class. In other words, "k" may be the number of product classification classified by any one of the first class to the third class. The class to be used can be appropriately determined by a manager of the personalized home shopping broadcast system 100.

Figure 6:
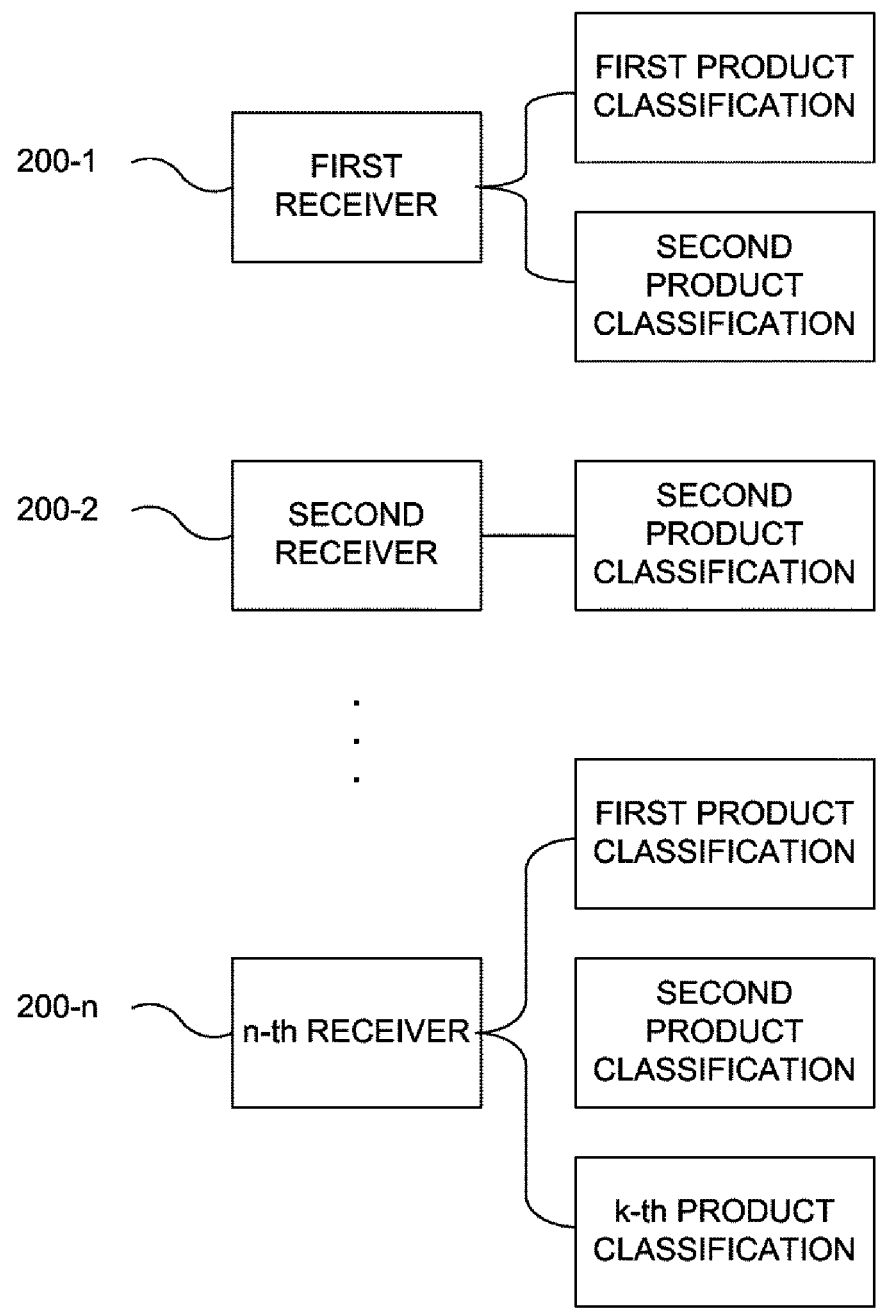
FIG. 6 shows examples of product classification groups for receivers that are extracted by the personalized home shopping broadcast system according to the embodiments described herein.

FIG. 6 shows examples of product classification groups for the receivers that are extracted by the personalized home shopping broadcast system according to the embodiments described herein.

Referring to FIG. 6, the product classification group for the first receiver 200-1 may include the first product classification and the second product classification; the product classification group for the second receiver 200-2 may include the second product classification; and the product classification group for the n-th receiver 200-n may include the first product classification, the second product classification, and the k-th product classification. Each of the product classification groups for the first receiver 200-1 to the n-th receiver 200-n may include at least one of the first product classification to the k-th product classification.

Hereinafter, a process of extracting the product classification groups for the first receiver 200-1 to the n-th receiver 200-n will be described in detail.

As described above, the viewing histories include the first viewing history to the n-th viewing history respectively received from the first receiver 200-1 to the n-th receiver 200-n. For example, a process of extracting a product classification group for an i-th receiver (i being a natural number greater than or equal to 1 and smaller than or equal to n) among the first receiver 200-1 to the n-th receiver 200-n will be described below.

The first instruction 150-1 may include the first sub-instruction 150-1-1 to the fourth sub-instruction 150-1-4.

The first sub-instruction 150-1-1, when executed, analyzes an i-th viewing history received from the i-th receiver to determine each of a first reference frequency to a k-th reference frequency where the first reference frequency is the number of times that the product belonging to the first product classification is provided by the i-th receiver during a predetermined period through the home shopping channel for a time period longer than or equal to a first threshold from the selection of the home shopping channel based on the user input in the i-th receiver and the k-th reference frequency is the number of times that the product belonging to the k-th product classification is provided by the i-th receiver during the predetermined period through the home shopping channel for a time period longer than or equal to the first threshold from the selection of the home shopping channel based on the user input in the i-th receiver. The first sub-instruction 150-1-1 also determines each of a first bounce frequency to a k-th bounce frequency where the first bounce frequency is the number of times that the product belonging to the first product classification is provided by the i-th receiver during the predetermined period through the home shopping channel for a time period longer than or equal to the first threshold and shorter than or equal to a second threshold from the selection of the home shopping channel based on the user input in the i-th receiver and the k-th bounce frequency is the number of times that the product belonging to the k-th product classification is provided by the i-th receiver during the predetermined period through the home shopping channel for a time period longer than or equal to the first threshold and shorter than or equal to the second period from the selection of the home shopping channel based on the user input in the i-th receiver.

The predetermined period can be set to, e.g., one day, one week, or one month.

The first threshold is determined while considering a delay time from when each of the first receiver 200-1 to the n-th receiver 200-n receives a user input of selecting the home shopping channel to when the home shopping channel is signal-processed and broadcasted. For example, a predetermined period of time may be required from when the first receiver 200-1 receives the user input of selecting the home shopping channel, e.g., the channel No. 53, to when the channel No. 53 is signal-processed and broadcasted. In addition, the viewer can select the home shopping channel by pressing a channel-up button instead of directly selecting a channel number. The first threshold is determined while considering such a period of time. For example, the first threshold may be set to three seconds.

The second threshold indicates a period of time required for a viewer who has selected the home shopping channel and has checked the content of the home shopping channel to determine whether to keep watching the home shopping channel or to switch to another channel. In other words, the second threshold indicates a period of time required for a viewer to determine whether or not to keep watching the home shopping channel without channel zapping. The second threshold may be set to, e.g., 30 seconds.

Each of the first reference frequency to the k-th reference frequency and each of the first bounce frequency to the k-th bounce frequency may be determined when a desired product is being broadcasted at the time of selecting the home shopping channel in each of the first receiver 200-1 to the n-th receiver 200-n. In other words, the case where the viewer keeps watching the home shopping channel without switching to another channel or the case where the advertisement is being broadcasted at the time of selecting the home shopping channel is preferably not included in the determination of each of the first reference frequency to the k-th reference frequency and the first bounce frequency to the k-th bounce frequency.

The second sub-instruction 150-1-2, when executed, determines a first bounce rate for the first product classification to a k-th bounce rate for the k-th product classification where the first bounce rate is a ratio of the first bounce frequency to the first reference frequency and the k-th bounce rate is a ratio of the k-th bounce frequency to the k-th reference frequency.

The first bounce rate is used to measure an interest level of a viewer of the i-th receiver with respect to a product belonging to the first product classification. In other words, if the first bounce rate is low, it is determined that the viewer of the i-th receiver is highly interested in the product belonging to the first product classification. On the contrary, if the first bounce rate is high, it is determined that the viewer of the i-th receiver has a low interest in the product belonging to the first product classification.

The third sub-instruction 150-1-3, when executed, analyzes the i-th viewing history to calculate a first average viewing time to a k-th average viewing time where the first average viewing time is a time period during which a product belonging to the first product classification is provided by the i-th receiver during the predetermined period through the home shopping channel and the k-th average viewing time is a time period during which a product belonging to the k-th product classification is provided by the i-th receiver during the predetermined period through the home shopping channel.

The fourth sub-instruction 150-1-4, when executed, compares interest indices for the first product classification to the k-th product classification with a predetermined threshold where the interest index for the first product classification is extracted based on the first average viewing time and the first bounce rate and the interest index for the k-th product classification is extracted based on the k-th average viewing time and the k-th bounce rate. Then, the fourth sub-instruction 150-1-4 specifies a product classification(s) having an interest index higher than the threshold among the first product classification as the k-th product classification to the product classification group for the i-th receiver.

An interest index for a j-th product classification (j being a natural number greater than or equal to 1 and smaller than or equal to k) can be determined as, e.g., a value obtained by subtracting, from a value obtained by multiplying a normalized j-th average viewing time by a first weight, a value obtained by multiplying a normalized j-th bounce rate by a second weight.

The normalized j-th average viewing time may be within a range of, e.g., 1 to 100. The normalized j-th bounce rate may be within a range of, e.g., 1 to 100.

The first weight and the second weight may be positive numbers, and the sum of the first weight and the second weight may be 1. On the assumption that the first weight is 0.8; the second weight is 0.2; the threshold is 50; the normalized j-th average viewing time is 80; and the normalized j-th bounce rate is 60, the value obtained by subtracting the value obtained by multiplying the normalized j-th bounce rate by the second weight from the value obtained by multiplying the normalized j-th average viewing time by the first weight is 52, which is higher than the threshold. In this case, the j-th product classification can be included in the product classification group for the i-th receiver.

By executing the first sub-instruction 150-1-1 to the fourth sub-instruction 150-1-4 while appropriately changing i and j, it is possible to extract the product classification groups for the first receiver 200-1 to the n-th receiver 200-n.

The second instruction 150-2, when executed, specifies the basic content for the basic product that can be provided through the home shopping channel for the predetermined time period according to the broadcasting schedule. In other words, the second instruction 150-2 specifies the basic content for the basic product to be broadcasted from 8 PM to 8:30 PM on Dec. 17, 2017, for example, based on the broadcasting schedule organized according to the broadcasting policy of the personalized home shopping broadcast system 100.

The third instruction 150-3, when executed, dynamically selects, from a plurality of contents, a first personalized content for a first product that can be provided through the home shopping channel for a predetermined time period, e.g., from 8:00 PM to 8:30 PM on Dec. 17, 2017. The first personalized content is dynamically selected such that the number of product classification groups each including at least one of the product classification of the basic product and the product classification of the first product among the product classification groups for the first receiver 200-1 to the n-th receiver 200-n becomes the maximum.

It is desirable that the basic product and the first product belong to product classifications different from each other among the first product classification to the k-th product classification. In other words, if the basic product and the first product belong to the same product classification, the number of viewers, who are not interested in both of the basic product and the first product among the entire viewers of the first receiver 200-1 to the n-th receiver 200-n, increases.

The third instruction 150-3 may include the fifth sub-instruction 150-3-1.

The fifth sub-instruction 150-3-1, when executed, selects the first personalized content such that the sum of the respective expected sales prices for the first receiver 200-1 to the n-th receiver 200-n becomes the maximum based on information of the respective average sales prices for the first product classifications to the k-th product classification.

For example, when there are multiple contents each of which leads to the maximum number of product classification groups each including at least one of the product classification of the basic product and the product classification of the first product among the product classification groups for the first receiver 200-1 to the n-th receiver 200-n, the first personalized content can be selected based on the expected sales price.

The expected sales price for the i-th receiver can be determined based on the average sales price for the product classification of the first product when the product classification group for the i-th receiver includes the product classification of the first product without including the product classification of the basic product. The expected sales price for the i-th receiver can be determined based on the average sales price for the product classification of the basic product when the product classification group for the i-th receiver does not include the product classification of the basic product.

The program 150 may further include the fourth instruction 150-4.

The fourth instruction 150-4 executes one of a first transmission mode, a second transmission mode and a third transmission mode. In the first transmission mode, both of the basic content and the first personalized content are transmitted to each of the first receiver 200-1 to the n-th receiver 200-n. In the second transmission mode, the contents to be respectively transmitted to the first receiver 200-1 to the n-th receiver 200-n are selected between the basic content and the first personalized content based on the product classification groups for the first receiver 200-1 to the n-th receiver 200-n and the selected contents are respectively transmitted to the first receiver 200-1 to the n-th receiver 200-n. In the third transmission mode, upon the request from at least one of the first receiver 200-1 to the n-th receiver 200-n, one of the basic content and the first personalized content is transmitted to the corresponding receiver.

For example, in the first transmission mode, both of the basic content and the first personalized content are transmitted through the home shopping channel in a similar manner as in the conventional broadcast system that transmits both of the basic content and the first personalized content to each of the first receiver 200-1 to the n-th receiver 200-n in a multiplexing manner through the channel number specified as the home shopping channel.

For example, in the second transmission mode, the first personalized content is transmitted to the i-th receiver (i being a natural number greater than or equal to 1 and smaller than or equal to n) among the first receiver 200-1 to the n-th receiver 200-n when the product classification group for the i-th receiver includes the product classification of the first product without including the product classification of the basic product. Otherwise, the basic content is transmitted to the i-th receiver. In other words, in the second transmission mode, the first personalized content is transmitted to the first receiver 200-1 when the product classification group for the first receiver 200-1 includes the product classification of the first product without including the product classification of the basic product.

For example, in the third transmission mode, the request for transmission of one of the basic content and the first personalized content is received from at least one of the first receiver 200-1 to the n-th receiver 200-n, e.g., the i-th receiver, and one of the basic content and the first personalized content is transmitted to the i-th receiver in response to the request.

For example, when the request for transmission of the first personalized content is received from the first receiver 200-1, the personalized home shopping broadcast system 100 can transmit the first personalized content to the first receiver using the third transmission mode.

Second Embodiment

In the above-described first embodiment, the personalized home shopping broadcast system 100 transmits at least one of the basic content and the first personal content to each of the first receiver 200-1 to the n-th receiver 200-n.

However, the number of the personalized contents that can be transmitted to each of the first receiver 200-1 to the n-th receiver 200-n is not limited to one, i.e., the first personalized content.

In accordance with the second embodiment described herein, the program 150 may further include the fifth instruction 150-5.

The fifth instruction 150-5, when executed, dynamically selects, from a plurality of contents, each of a second personalized content for a second product to an m-th personalized content for an m-th product that can be provided through the home shopping channel for a predetermined time period. Each of the second to the m-th personalized contents is dynamically selected such that the number of product classification groups each including at least one among the product classification of the first product, the product classifications of the second product to the m-th product, and the product classification of the basic product among the product classification groups for the first receiver 200-1 to the n-th receiver 200-n becomes the maximum.

It is desirable that the basic product, the first product, and the second to the m-th products belong to product classifications different from one another among the first product classification to the k-th product classification. In other words, when at least two of the basic product, the first product, and the second product to the m-th product belong to the same product classification, the number of viewers, who are not interested in all of the basic product, the first product, and the second product to the m-th product among the entire viewers of the first receiver 200-1 to the n-th receiver 200-n may increase.

The fifth instruction 150-5 may include the sixth sub-instruction 150-5-1.

The sixth sub-instruction 150-5-1, when executed, selects each of the second personalized content to the m-th personalized content such that the sum of the respective expected sales prices for the first receiver 200-1 to the n-th receiver 200-n becomes the maximum based on information of the respective average sales prices for the first product classifications to the k-th product classification.

The expected sales price for the i-th receiver (i being a natural number greater than or equal to 1 and smaller than or equal to n) can be determined based on the average sales price for the product classification of the first product when the product classification group for the i-th receiver includes the product classification of the first product without including the product classification of the basic product. The expected sales price for the i-th receiver can be determined based on the average sales price for the product classification of a p-th product (p being a natural number greater than or equal to 2 and smaller than or equal to m) when the product classification group for the i-th receiver includes the product classification of the p-th product without including the product classification of the basic product and the product classification of the first product to a (p−1)-th product. Other than the cases described above, the expected sales price can be determined based on the average sales price for the product classification of the basic product.

Preferably, the number of the product classification groups including the product classification of the (p−1)-th product is greater than the number of the product classification groups including the product classification of the p-th product among the product classification groups for the first receiver 200-1 to the n-th receiver 200-n.

For example, when "m" is 3, among the product classification groups for the first receiver 200-1 to the n-th receiver 200-n, the number of the product classification groups including the product classification of the first product is greater than the number of the product classification groups including the product classification of the second product, and the number of the product classification groups including the product classification of the second product is greater than the number of the product classification groups including the product classification of the third product.

As described above, the program 150 may further include the sixth instruction 150-6.

The sixth instruction 150-6 executes one of a fourth transmission mode, a fifth transmission mode, and a sixth transmission mode. In the fourth transmission mode, all of the first personalized content, the second to m-th personalized contents, and the basic content are transmitted to each of the first receiver 200-1 to the n-th receiver 200-n. In the fifth transmission mode, contents to be respectively transmitted to the first receiver 200-1 to the n-th receiver 200-n are selected among the first personalized content, the second to m-th personalized contents, and the basic content based on the product classification groups for the first receiver 200-1 to the n-th receiver 200-n and the selected contents are respectively transmitted to the first receiver 200-1 to the n-th receiver 200-n. In the sixth transmission mode, upon a request from at least one of the first receiver 200-1 to the n-th receiver 200-n, e.g., the i-th receiver (i being a natural number greater than or equal to 1 and smaller than or equal to n), one of the first personalized content, the second to m-th personalized contents, and the basic content is transmitted to the i-th receiver.

For example, when "m" is 3, in the fourth transmission mode, all of the basic content, the first personalized content, the second personalized content, and the third personalized content are transmitted through the home shopping channel in a similar manner as in the conventional broadcast system that transmits all of the basic content, the first personalized content, the second personalized content, and the third personalized content to each of the first receiver 200-1 to the n-th receiver 200-n through the channel number specified as the home shopping channel.

Figure 7:
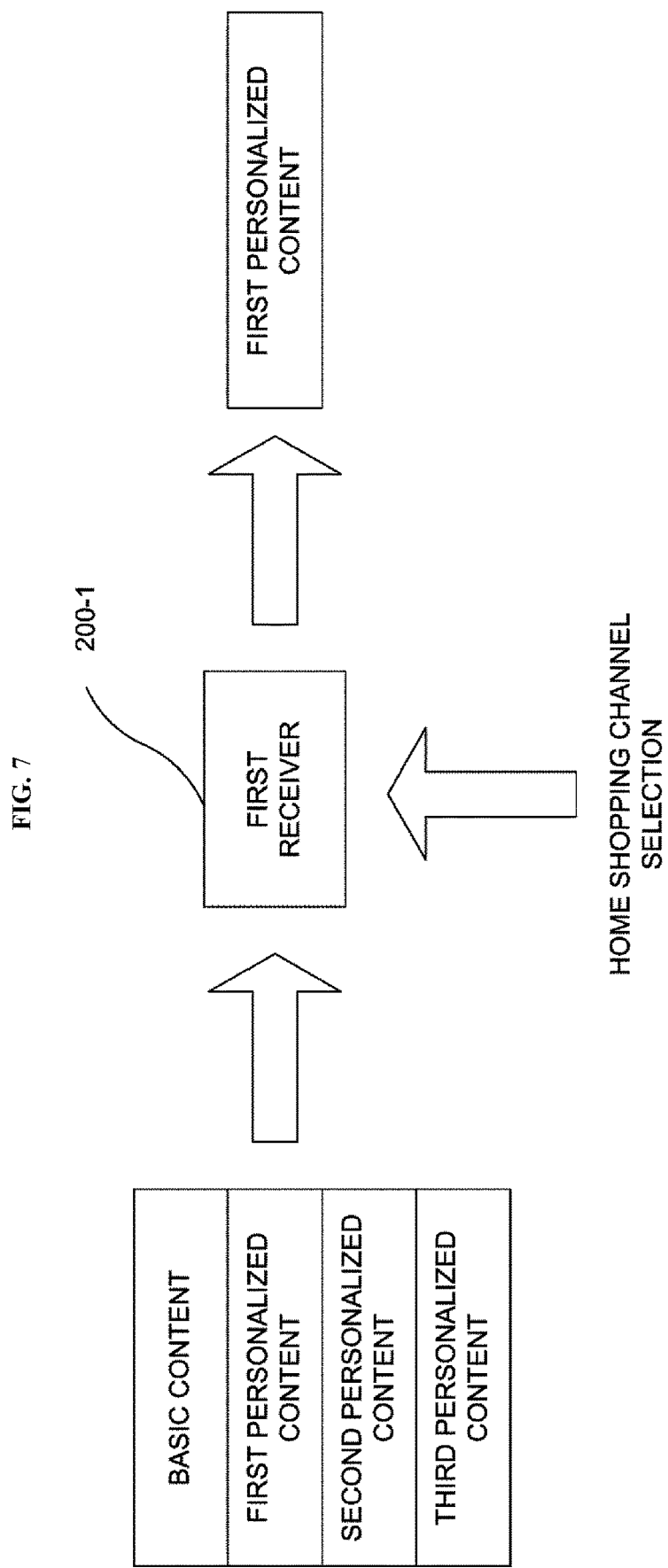
FIG. 7 shows an example of a state in which a personalized content is selected by a receiver in the personalized home shopping broadcast system according to the embodiments described herein.

FIG. 7 shows an example of a state in which a personalized content is selected by a receiver in the personalized home shopping broadcast system according to the embodiments described herein.

The first receiver 200-1 receives a user input of selecting a home shopping channel from a viewer. For example, when the product classification group for the first receiver 200-1 includes the product classification of the first product without including the product classification of the basic product, the first personalized content is signal-processed by the first receiver 200-1 among the basic content, the first personalized content, the second personalized content, and the third personalized content transmitted from the personalized home shopping broadcast system 100, and the signal-processed first personalized content is provided to the viewer.

For example, when "m" is 3, in the fifth transmission mode, the first personalized content is transmitted to the i-th receiver (i being a natural number greater than or equal to 1 and smaller than or equal to n) among the first receiver 200-1 to the n-th receiver 200-n when the product classification group for the i-th receiver includes the product classification of the first product without including the product classification of the basic product; the second personalized content is transmitted to the i-th receiver when the product classification group for the i-th receiver includes the product classification of the second product without including the product classifications of the basic group and the first product; the third personalized content is transmitted to the i-th receiver when the product classification group for the i-th receiver includes the product classification of the third product without including the product classifications of the basic product, the first product, and the second product; and the basic content is transmitted to the i-th receiver in the other cases, i.e., when the product classification group for the i-th receiver (i being a natural number greater than or equal to 1 and smaller than or equal to n) includes the product classification of the basic group or does not include all of the product classifications of the basic product, the first product, the second product, and the third product.

In the case of using the fifth transmission mode, at least one of the basic content and the first personalized content to the m-th personalized content can be transmitted to at least one of the first receiver 200-1 to the n-th receiver 200-n in a multicast manner or a unicast manner.

Therefore, the value of "m" in the fifth transmission mode may be greater than that in the fourth transmission mode. For example, when "m" is 1000, at least one of 1000 predetermined personalized contents can be transmitted to at least one of the first receiver 200-1 to the n-th receiver 200-n.

Accordingly, home shopping contents can be transmitted in a more personalized manner to the viewers of the first receiver 200-1 to the n-th receiver 200-n.

Figure 8:
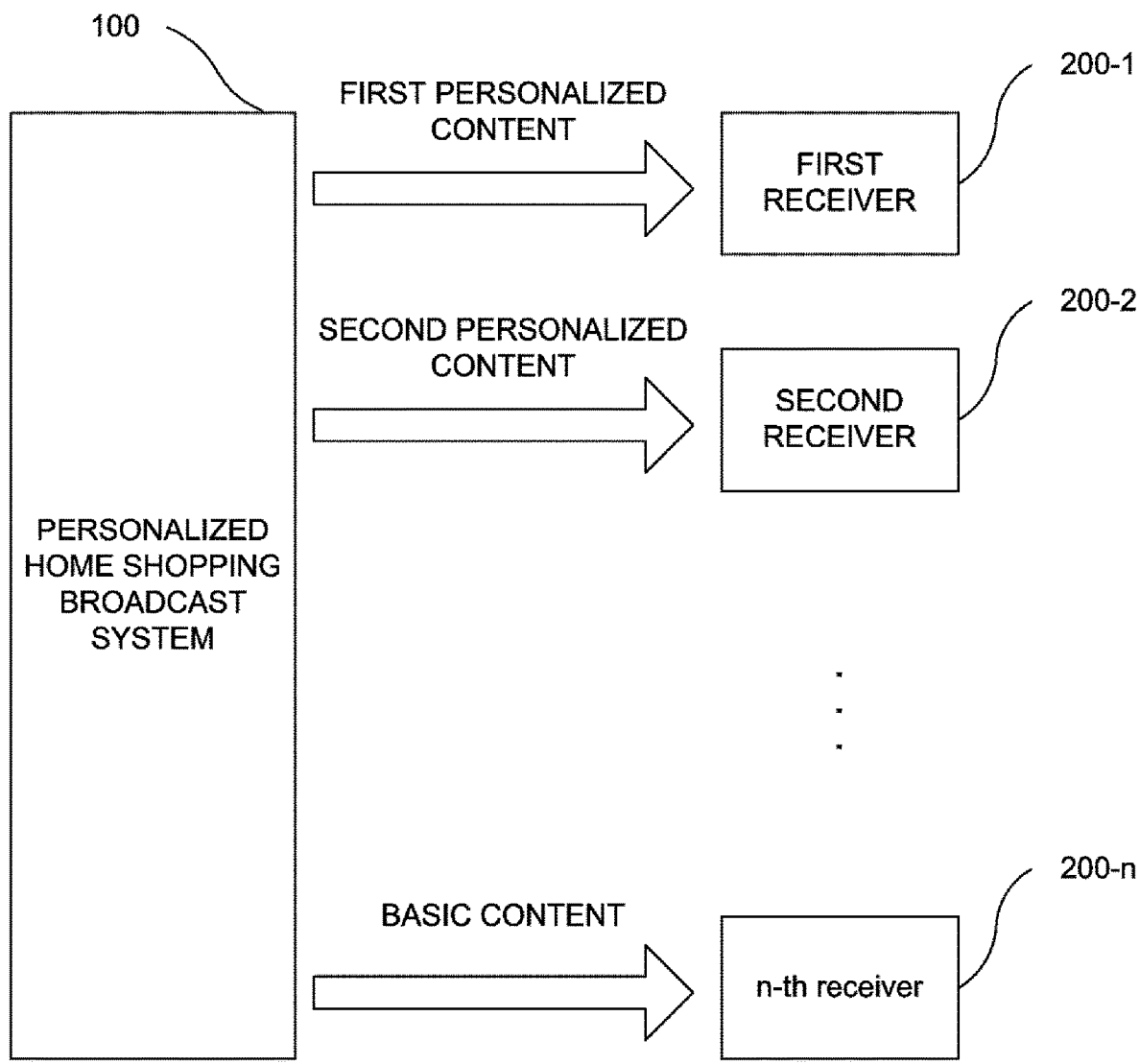
FIG. 8 shows an example of a state in which personalized contents are selected and transmitted to receivers by the personalized home shopping broadcast system according to the embodiments described herein.

FIG. 8 shows an example of a state in which personalized contents are selected and transmitted to receivers by the personalized home shopping broadcast system according to the embodiments described herein.

In other words, in the fifth transmission mode, the first personalized content is transmitted to the first receiver 200-1 when the product classification group for the first receiver 200-1 includes the product classification of the first product without including the product classification of the basic product. Further, the second personalized content is transmitted to the second receiver 200-2 when the product classification group for the second receiver 200-2 includes the product classification of the second product without including the product classifications of the basic product and the first product. Further, the basic content is transmitted to the n-th receiver 200-n when the product classification group for the n-th receiver 200-n does not include the product classifications of the first product and the second product.

For example, in the sixth transmission mode, the request for transmission of one of the first to third personalized contents and the basic content is received from at least one of the first receiver 200-1 to the n-th receiver 200-n, and one of the first to third personalized contents and the basic content is transmitted to the corresponding receiver in response to the request.

Figure 9:
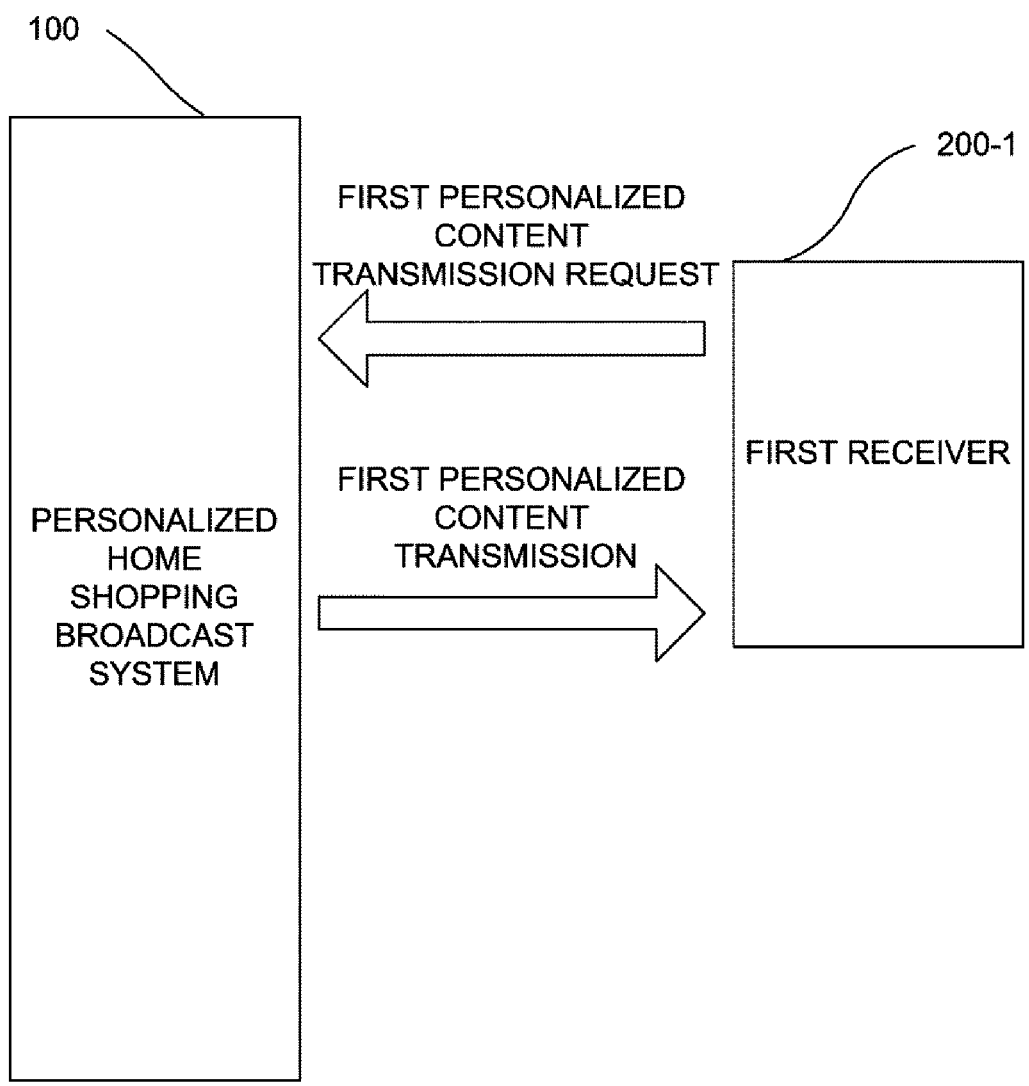
FIG. 9 shows an example of a state in which a personalized content is transmitted by the personalized home shopping broadcast system according to the embodiments described herein in response to a request from a receiver.

FIG. 9 shows an example of a state in which a personalized content is transmitted by the personalized home shopping broadcast system according to the embodiments described herein in response to a request from a receiver.

For example, when the request for transmission of the first personalized content is received from the first receiver 200-1, the personalized home shopping broadcast system 100 can transmit the first personalized content to the first receiver 200-1 using the sixth transmission mode.

In the case of using the sixth transmission mode, at least one of the basic content and the first to m-th personalized contents can be transmitted to at least one of the first receiver 200-1 to the n-th receiver 200-n using, e.g., a VOD service.

Therefore, the value of "m" in the sixth transmission mode may be greater than that in the fourth transmission mode. For example, when "m" is 1000, at least one of 1000 predetermined personalized contents can be transmitted to at least one of the first receiver 200-1 to the n-th receiver 200-n using the VOD service.

Third Embodiment

As described above, the program 150 may further include the seventh instruction 150-7.

The seventh instruction 150-7, when executed, transmits identification information on the product classification groups for the first receiver 200-1 to the n-th receiver 200-n to the first receiver 200-1 to the n-th receivers 200-n, respectively.

For example, the first receiver 200-1 receives the identification information on the product classification group for the first receiver 200-1 and, then, the content is selected and signal-processed by the first receiver 200-1 based on the received identification information as described with reference to FIG. 7.

If the product classification group for the first receiver 200-1 includes the product classification of the first product without including the product classification of the basic product, the first personalized content is selected and signal-processed by the first receiver 200-1 between the basic content and the first personalized content that are transmitted through the first transmission mode, and, then, the signal-processed first personalized content is provided to the viewer.

As described above, in accordance with the embodiments described above, a home shopping content suitable for a specific viewer can be dynamically selected and provided using viewing histories of the home shopping channel. Particularly, a home shopping content in which a large number of viewers are interested can be provided by dynamically selecting a home shopping content using product classification groups specified for receivers using an interest index calculated based on a bounce rate defined by the present disclosure.

While various examples according to the technique have been described in detail, the above descriptions merely illustrates the idea of the technique described herein, and it will be understood by those skilled in the art to which the technique described herein belongs that various changes and modifications may be made without departing from the scope of the essential characteristics of the technique described herein.

Accordingly, the exemplary embodiments disclosed herein are not used to limit the idea of the technique described herein, but to explain the technique described herein, and the scope of the technical idea of the technique described herein is not limited by those embodiments. Therefore, the scope of protection of the technique described herein should be construed as defined in the following claims, and all technical ideas that fall within the idea of the technique described herein are intended to be embraced by the scope of the claims described below.

In accordance with the embodiments of the technique described herein, a home shopping content suitable for a specific viewer can be dynamically selected and provided using viewing histories of a home shopping channel. Particularly, a home shopping content in which a large number of viewers are interested can be provided by dynamically selecting a home shopping content using product classification groups specified for receivers using an interest index calculated based on a bounce rate defined by the present disclosure.

Supplementary Notes

Embodiments of the technique described herein will be supplementarily described below.

<Supplementary Note 1>

According to one aspect of the present disclosure, there is provided a method of providing a personalized content by using a personalized home shopping broadcast system including: one or more memories storing the program therein; and one or more processors configured to execute the program, the method including:

(a) extracting a product classification group for each of a first receiver to an n-th receiver that receives and provides a home shopping channel from a product classification criterion, that includes a first product classification to a k-th product classification determined in advance, based on a viewing history of the home shopping channel received from each of the first to n-th receivers where each of "n" and "k" is a natural number of 2 or higher;

(b) specifying a basic content for a basic product to be provided through the home shopping channel for a predetermined time period according to a broadcasting schedule; and (c) dynamically selecting, from a plurality of contents, a first personalized content for a first product to be provided through the home shopping channel for the predetermined time period such that the number of product classification groups, each of which includes at least one of a product classification of the basic product and a product classification of the first product among the product classification groups for the first to n-th receivers, becomes the maximum.

<Supplementary Note 2>

The method of Supplementary note 1, further including:

(d) executing one of a first transmission mode, a second transmission mode and a third transmission mode, wherein, in the first transmission mode, both of the basic content and the first personalized content are transmitted to each of the first to n-th receivers, in the second transmission mode, contents to be respectively transmitted to the first to n-th receivers are selected between the basic content and the first personalized content based on the product classification groups for the first to n-th receivers and the selected contents are respectively transmitted to the first to n-th receivers, and in the third transmission mode, upon a request from at least one of the first to n-th receivers, one of the basic content and the first personalized content is transmitted to the at least one of the first to n-th receivers.

<Supplementary Note 3>

The method of Supplementary note 2, wherein in the second transmission mode, the first personalized content is transmitted to an i-th receiver among the first to n-th receivers where "i" is a natural number greater than or equal to 1 and smaller than or equal to "n" when a product classification group for the i-th receiver includes the product classification of the first product without including the product classification of the basic product, and the basic content is transmitted to the i-th receiver in the other cases.

<Supplementary Note 4>

The method of Supplementary note 1, wherein the basic product and the first product belong to product classification different from each other among the first to k-th product classifications.

<Supplementary Note 5>

The method of Supplementary note 1, further including:

(e) dynamically selecting each of a second personalized content for a second product to an m-th personalized content for an m-th product that are to be provided through the home shopping channel for the predetermined time period such that the number of product classification groups, each of which includes at least one of the product classification of the first product, product classifications of the second to m-th products, and the product classification of the basic product among the product classification groups for the first to n-th receivers, becomes the maximum where "m" is a natural number of 2 or higher.

<Supplementary Note 6>

The method of Supplementary note 5, further including:

(f) executing one of a fourth transmission mode, a fifth transmission mode, and a sixth transmission mode, wherein, in the fourth transmission mode, all of the first personalized content, the second to m-th personalized contents, and the basic content are transmitted to each of the first to n-th receivers, in the fifth transmission mode, contents to be respectively transmitted to the first to n-th receivers are selected among the first personalized content, the second to m-th personalized contents, and the basic content based on the product classification groups for the first to n-th receivers and the selected contents are respectively transmitted to the first to n-th receivers, and in the sixth transmission mode, upon a request from at least one of the first to n-th receivers, one of the first personalized content, the second to m-th personalized contents, and the basic content is transmitted to the at least one of the first to n-th receivers.

<Supplementary Note 7>

The method of Supplementary note 6, wherein in the fifth transmission mode, the first personalized content is transmitted to an i-th receiver among the first to n-th receivers where "i" is a natural number greater than or equal to 1 and smaller than or equal to "n" when a product classification group for the i-th receiver includes the product classification of the first product without including the product classification of the basic product, a p-th personalized content is transmitted to the i-th receiver where "p" is a natural number greater than or equal to 2 and smaller than or equal to "m" when the product classification group for the i-th receiver includes a product classification of a p-th product without including the product classification of the basic product and product classifications of the first product to a (p−1)-th product; and the basic content is transmitted to the i-th receiver in the other cases.

<Supplementary Note 8>

The method of Supplementary note 5, wherein the basic product, the first product, and the second to m-th products belong to product classification different from one another among the first to k-th product classifications.

<Supplementary Note 9>

The method of Supplementary note 1, wherein the viewing history includes a first viewing history received from the first receiver to an n-th viewing history received from the n-th receiver, and (a) includes:

(a-1) analyzing an i-th viewing history where "i" is a natural number greater than or equal to 1 and smaller than or equal to "n" to determine:

each of a first reference frequency to a k-th reference frequency where the first reference frequency is the number of times that a product belonging to the first product classification is provided by an i-th receiver among the first to n-th receivers during a predetermined period through the home shopping channel for a time period longer than or equal to a first threshold from a selection of the home shopping channel based on a user input in the i-th receiver, and the k-th reference frequency is the number of times that a product belonging to the k-th product classification is provided by the i-th receiver during the predetermined period through the home shopping channel for the time period longer than or equal to the first threshold from the selection of the home shopping channel based on the user input in the i-th receiver; and each of a first bounce frequency to a k-th bounce frequency where the first bounce frequency is the number of times that the product belonging to the first product classification is provided by the i-th receiver during the predetermined period through the home shopping channel for a time period longer than or equal to the first threshold and shorter than or equal to a second threshold from the selection of the home shopping channel based on the user input in the i-th receiver, and the k-th bounce frequency is the number of times that the product belonging to the k-th product classification is provided by the i-th receiver during the predetermined period through the home shopping channel for the time period longer than or equal to the first threshold and shorter than or equal to the second period from the selection of the home shopping channel based on the user input in the i-th receiver;

(a-2) determining a first bounce rate for the first product classification to a k-th bounce rate for the k-th product classification where the first bounce rate is a ratio of the first bounce frequency to the first reference frequency and the k-th bounce rate is a ratio of the k-th bounce frequency to the k-th reference frequency;

(a-3) analyzing the i-th viewing history to calculate a first average viewing time to a k-th average viewing time where the first average viewing time is a time period during which a product belonging to the first product classification is provided by the i-th receiver during the predetermined period through the home shopping channel and the k-th average viewing time is a time period during which a product belonging to the k-th product classification is provided by the i-th receiver during the predetermined period through the home shopping channel; and (a-4) comparing interest indices for the first to k-th product classifications with a predetermined threshold where the interest index for the first product classification is extracted based on the first average viewing time and the first bounce rate and the interest index for the k-th product classification is extracted based on the k-th average viewing time and the k-th bounce rate, and specifies a product classification having an interest index higher than the predetermined threshold among the first to k-th product classifications to the product classification group for the i-th receiver.

<Supplementary Note 10>

The method of Supplementary note 9, wherein an interest index for a j-th product classification where "j" is a natural number greater than or equal to 1 and smaller than or equal to "k" is obtained by subtracting, from a value obtained by multiplying a normalized j-th average viewing time by a first weight, a value obtained by multiplying a normalized j-th bounce rate by a second weight.

<Supplementary Note 11>

The method of Supplementary note 10, wherein the first weight and the second weight are positive numbers, and the sum of the first weight and the second weight is 1.

<Supplementary Note 12>

The method of Supplementary note 1, wherein (c) includes:

(c-1) selecting the first personalized content such that the sum of respective expected sales prices for the first to n-th receivers becomes the maximum based on information of respective average sales prices for the first to k-th product classifications.

<Supplementary Note 13>

The method of Supplementary note 12, wherein an expected sales price for an i-th receiver where "i" is a natural number greater than or equal to 1 and smaller than or equal to "n" is determined based on an average sales price for the product classification of the first product when the product classification group for the i-th receiver includes the product classification of the first product without including the product classification of the basic product; and the expected sales price for the i-th receiver is determined based on an average sales price for the product classification of the basic product when the product classification group for the i-th receiver does not include the product classification of the first group.

<Supplementary Note 14>

The method of Supplementary note 5, wherein (e) includes:

(e-1) selecting each of the second to m-th personalized contents such that the sum of respective expected sales prices for the first to n-th receivers becomes the maximum based on information of respective average sales prices for the first to k-th product classifications.

<Supplementary Note 15>

The method of Supplementary note 14, wherein an expected sales price for an i-th receiver where "i" is a natural number greater than or equal to 1 and smaller than or equal to "n" is determined based on an average sales price for the product classification of the first product when the product classification group for the i-th receiver includes the product classification of the first product without including the product classification of the basic product; the expected sales price for the i-th receiver is determined based on an average sales price for a product classification of a p-th product where "p" is a natural number greater than or equal to 2 and smaller than or equal to "m" when the product classification group for the i-th receiver includes a product classification of the p-th product without including the product classification of the basic product and product classifications of the first product to a (p−1)-th products; and the expected sales price for the i-th receiver is determined based on an average sales price for the product classification of the basic product in the other cases, and among the product classification groups for the first to n-th receivers, the number of the product classification groups including the product classification of the (p−1)-th product is greater than the number of the product classification groups including the product classification of the p-th product.

<Supplementary Note 16>

The method of Supplementary note 1, further including:

(g) transmitting identification information on the product classification groups for the first to n-th receivers to the first to n-th receivers, respectively.

<Supplementary Note 17>

The method of Supplementary note 1, wherein the "n" is either the total number of receivers that receive and provide the home shopping channel or the number of predetermined receivers that receive and provide the home shopping channel among the entire receivers.

<Supplementary Note 18>

The method of Supplementary note 1, wherein each of the product classification groups for the first to n-th receivers include at least one of the first to k-th product classifications.

| [Description of Reference Numerals] | |
|---|---|
| 100: personalized home shopping broadcast system | 110: processor |
| 130: memory | 150: program |
| 200: receiver | |

What is claimed is:

1. A personalized home shopping broadcast system comprising:
   one or more processors;
   one or more memories; and
   one or more programs that are stored in the one or more memories and executed by the one or more processors,
   wherein the one or more programs includes:
   a first instruction that, when executed, extracts a product classification group for each of a first receiver to an n-th receiver that receives and provides a home shopping channel from a product classification criterion, that includes a first product classification to a k-th product classification determined in advance, based on a viewing history of the home shopping channel received from each of the first to n-th receivers where each of "n" and "k" is a natural number of 2 or higher;
   a second instruction that, when executed, specifies a basic content for a basic product to be provided through the home shopping channel for a predetermined time period according to a broadcasting schedule; and
   a third instruction that, when executed, dynamically selects, from a plurality of contents, a first personalized content for a first product to be provided through the home shopping channel for the predetermined time period such that the number of product classification groups, each of which includes at least one of a product classification of the basic product and a product classification of the first product among the product classification groups for the first to n-th receivers, becomes a maximum,
   wherein the third instruction includes:
   a fifth sub-instruction that, when executed, selects the first personalized content such that the sum of respective expected sales prices for the first to n-th receivers becomes a maximum based on information of respective average sales prices for the first to k-th product classifications.

2. The personalized home shopping broadcast system of claim 1, wherein the one or more programs further include:
   a fourth instruction that executes one of a first transmission mode, a second transmission mode and a third transmission mode,
   wherein, in the first transmission mode, both of the basic content and the first personalized content are transmitted to each of the first to n-th receivers,
   in the second transmission mode, contents to be respectively transmitted to the first to n-th receivers are selected between the basic content and the first personalized content based on the product classification groups for the first to n-th receivers and the selected contents are respectively transmitted to the first to n-th receivers, and
   in the third transmission mode, upon a request from at least one of the first to n-th receivers, one of the basic content and the first personalized content is transmitted to the at least one of the first to n-th receivers.

3. The personalized home shopping broadcast system of claim 2, wherein in the second transmission mode, the first personalized content is transmitted to an i-th receiver among the first to n-th receivers where "i" is a natural number greater than or equal to 1 and smaller than or equal to "n" when a product classification group for the i-th receiver includes the product classification of the first product without including the product classification of the basic product, and the basic content is transmitted to the i-th receiver in the other cases.

4. The personalized home shopping broadcast system of claim 1, wherein the basic product and the first product belong to product classification different from each other among the first to k-th product classifications.

5. The personalized home shopping broadcast system of claim 1, wherein the one or more programs further include:
   a fifth instruction that, when executed, dynamically selects each of a second personalized content for a second product to an m-th personalized content for an m-th product that are to be provided through the home shopping channel for the predetermined time period such that the number of product classification groups, each of which includes at least one of the product classification of the first product, product classifications of the second to m-th products, and the product classification of the basic product among the product classification groups for the first to n-th receivers, becomes a maximum where "m" is a natural number of 2 or higher.

6. The personalized home shopping broadcast system of claim 5, wherein the one or more programs further include:
   a sixth instruction that executes one of a fourth transmission mode, a fifth transmission mode, and a sixth transmission mode,
   wherein, in the fourth transmission mode, all of the first personalized content, the second to m-th personalized contents, and the basic content are transmitted to each of the first to n-th receivers,
   in the fifth transmission mode, contents to be respectively transmitted to the first to n-th receivers are selected among the first personalized content, the second to m-th personalized contents, and the basic content based on the product classification groups for the first to n-th receivers and the selected contents are respectively transmitted to the first to n-th receivers, and
   in the sixth transmission mode, upon a request from at least one of the first to n-th receivers, one of the first personalized content, the second to m-th personalized contents, and the basic content is transmitted to the at least one of the first to n-th receivers.

7. The personalized home shopping broadcast system of claim 6, wherein in the fifth transmission mode, the first personalized content is transmitted to an i-th receiver among the first to n-th receivers where "i" is a natural number greater than or equal to 1 and smaller than or equal to "n" when a product classification group for the i-th receiver includes the product classification of the first product without including the product classification of the basic product,
   a p-th personalized content is transmitted to the i-th receiver where "p" is a natural number greater than or equal to 2 and smaller than or equal to "m" when the product classification group for the i-th receiver includes a product classification of a p-th product without including the product classification of the basic product and product classifications of the first product to a (p−1)-th product; and
   the basic content is transmitted to the i-th receiver in the other cases.

8. The personalized home shopping broadcast system of claim 5, wherein the basic product, the first product, and the second to m-th products belong to product classification different from one another among the first to k-th product classifications.

9. The personalized home shopping broadcast system of claim 1, wherein the viewing history includes a first viewing history received from the first receiver to an n-th viewing history received from the n-th receiver, and
the first instruction includes:
a first sub-instruction that, when executed, analyzes an i-th viewing history where "i" is a natural number greater than or equal to 1 and smaller than or equal to "n" to determine:
each of a first reference frequency to a k-th reference frequency where the first reference frequency is the number of times that a product belonging to the first product classification is provided by an i-th receiver among the first to n-th receivers during a predetermined period through the home shopping channel for a time period longer than or equal to a first threshold from a selection of the home shopping channel based on a user input in the i-th receiver, and the k-th reference frequency is the number of times that a product belonging to the k-th product classification is provided by the i-th receiver during the predetermined period through the home shopping channel for the time period longer than or equal to the first threshold from the selection of the home shopping channel based on the user input in the i-th receiver; and
each of a first bounce frequency to a k-th bounce frequency where the first bounce frequency is the number of times that the product belonging to the first product classification is provided by the i-th receiver during the predetermined period through the home shopping channel for a time period longer than or equal to the first threshold and shorter than or equal to a second threshold from the selection of the home shopping channel based on the user input in the i-th receiver, and the k-th bounce frequency is the number of times that the product belonging to the k-th product classification is provided by the i-th receiver during the predetermined period through the home shopping channel for the time period longer than or equal to the first threshold and shorter than or equal to the second period from the selection of the home shopping channel based on the user input in the i-th receiver;
a second sub-instruction that, when executed, determines a first bounce rate for the first product classification to a k-th bounce rate for the k-th product classification where the first bounce rate is a ratio of the first bounce frequency to the first reference frequency and the k-th bounce rate is a ratio of the k-th bounce frequency to the k-th reference frequency;
a third sub-instruction that, when executed, analyzes the i-th viewing history to calculate a first average viewing time to a k-th average viewing time where the first average viewing time is a time period during which a product belonging to the first product classification is provided by the i-th receiver during the predetermined period through the home shopping channel and the k-th average viewing time is a time period during which a product belonging to the k-th product classification is provided by the i-th receiver during the predetermined period through the home shopping channel; and
a fourth sub-instruction that, when executed, compares interest indices for the first to k-th product classifications with a predetermined threshold where the interest index for the first product classification is extracted based on the first average viewing time and the first bounce rate and the interest index for the k-th product classification is extracted based on the k-th average viewing time and the k-th bounce rate, and specifies a product classification having an interest index higher than the predetermined threshold among the first to k-th product classifications to the product classification group for the i-th receiver.

10. The personalized home shopping broadcast system of claim 9, wherein an interest index for a j-th product classification where "j" is a natural number greater than or equal to 1 and smaller than or equal to "k" is obtained by subtracting, from a value obtained by multiplying a normalized j-th average viewing time by a first weight, a value obtained by multiplying a normalized j-th bounce rate by a second weight.

11. The personalized home shopping broadcast system of claim 10, wherein the first weight and the second weight are positive numbers, and the sum of the first weight and the second weight is 1.

12. The personalized home shopping broadcast system of claim 1, wherein an expected sales price for an i-th receiver where "i" is a natural number greater than or equal to 1 and smaller than or equal to "n" is determined based on an average sales price for the product classification of the first product when the product classification group for the i-th receiver includes the product classification of the first product without including the product classification of the basic product; and the expected sales price for the i-th receiver is determined based on an average sales price for the product classification of the basic product when the product classification group for the i-th receiver does not include the product classification of the first group.

13. The personalized home shopping broadcast system of claim 5, wherein the fifth instruction includes:
a sixth sub-instruction that, when executed, selects each of the second to m-th personalized contents such that the sum of respective expected sales prices for the first to n-th receivers becomes a maximum based on information of respective average sales prices for the first to k-th product classifications.

14. The personalized home shopping broadcast system of claim 13, wherein an expected sales price for an i-th receiver where "i" is a natural number greater than or equal to 1 and smaller than or equal to "n" is determined based on an average sales price for the product classification of the first product when the product classification group for the i-th receiver includes the product classification of the first product without including the product classification of the basic product; the expected sales price for the i-th receiver is determined based on an average sales price for a product classification of a p-th product where "p" is a natural number greater than or equal to 2 and smaller than or equal to "m" when the product classification group for the i-th receiver includes a product classification of the p-th product without including the product classification of the basic product and product classifications of the first product to a (p−1)-th products; and the expected sales price for the i-th receiver is determined based on an average sales price for the product classification of the basic product in the other cases, and
among the product classification groups for the first to n-th receivers, the number of the product classification groups including the product classification of the (p−1)-th product is greater than the number of the product classification groups including the product classification of the p-th product.

15. The personalized home shopping broadcast system of claim 1, wherein the one or more programs further include:
    a seventh instruction that, when executed, transmits identification information on the product classification groups for the first to n-th receivers to the first to n-th receivers, respectively.

16. The personalized home shopping broadcast system of claim 1, wherein the "n" is either the total number of receivers that receive and provide the home shopping channel or the number of predetermined receivers that receive and provide the home shopping channel among the entire receivers.

17. The personalized home shopping broadcast system of claim 1, wherein each of the product classification groups for the first to n-th receivers include at least one of the first to k-th product classifications.

\* \* \* \* \*